United States Patent
Shaaban et al.

(10) Patent No.: US 12,407,514 B2
(45) Date of Patent: *Sep. 2, 2025

(54) SYSTEM AND METHOD FOR SECURE ACCESS TO LEGACY DATA VIA A SINGLE SIGN-ON INFRASTRUCTURE

(71) Applicants: Ahmed Farouk Shaaban, South Barrington, IL (US); Venkat Thandra, South Barrington, IL (US)

(72) Inventors: Ahmed Farouk Shaaban, South Barrington, IL (US); Venkat Thandra, South Barrington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,064

(22) Filed: Oct. 11, 2023

(65) Prior Publication Data
US 2024/0039726 A1    Feb. 1, 2024

Related U.S. Application Data

(63) Continuation of application No. 17/010,017, filed on Sep. 2, 2020, now Pat. No. 11,811,928.

(60) Provisional application No. 62/898,095, filed on Sep. 10, 2019.

(51) Int. Cl.
| | |
|---|---|
| *H04L 9/32* | (2006.01) |
| *G06F 21/31* | (2013.01) |
| *H04L 9/40* | (2022.01) |
| *H04L 67/306* | (2022.01) |

(52) U.S. Cl.
CPC ............ *H04L 9/3213* (2013.01); *G06F 21/31* (2013.01); *H04L 9/3226* (2013.01); *H04L 63/0807* (2013.01); *H04L 67/306* (2013.01)

(58) Field of Classification Search
CPC . H04L 9/3213; H04L 9/3226; H04L 63/0807; H04L 67/306; H04L 63/0815; H04L 63/102; G06F 21/31
See application file for complete search history.

(56) References Cited

U.S. PATENT DOCUMENTS

| | | | |
|---|---|---|---|
| 2004/0128393 A1 | 7/2004 | Blakley, III et al. | |
| 2006/0155993 A1 | 7/2006 | Busboon | |
| 2006/0236382 A1* | 10/2006 | Hinton | G06F 21/41 726/8 |
| 2009/0205032 A1* | 8/2009 | Hinton | H04W 12/06 726/7 |
| 2014/0337954 A1* | 11/2014 | Ahmed | H04L 63/0815 726/8 |
| 2015/0339464 A1* | 11/2015 | Kode | G06F 21/31 726/18 |
| 2020/0021574 A1* | 1/2020 | Pinner | H04L 63/102 |

* cited by examiner

Primary Examiner — Henry Tsang
(74) Attorney, Agent, or Firm — Global IP Counselors, LLP (57) ABSTRACT

A method for securely accessing legacy data includes associating a first user account with a security token upon reception of the security token by an enterprise server from a security token service. The security token from the enterprise server is directly communicated to a legacy access provider. The legacy access provider is caused to initiate communication over a network directly with the security token service to request that the security token service authenticate the security token. Access to the legacy system is prevented upon the legacy access provider not verifying authentication of the security token.

20 Claims, 3 Drawing Sheets

SYSTEM AND METHOD FOR SECURE ACCESS TO LEGACY DATA VIA A SINGLE SIGN-ON INFRASTRUCTURE

PRIORITY

This patent application is a continuation application of U.S. patent application Ser. No. 17/010,017, filed Sep. 2, 2020, which claims priority to U.S. Provisional Patent Application No. 62/898,095, filed Sep. 10, 2019, entitled "Legacy System Access Via Federated Login," the benefit of the entire contents of both applications are incorporated herein by reference and relied upon.

BACKGROUND

Technical Field

This disclosure generally relates to a system and method for securely accessing legacy data from a server. More specifically, the present disclosure relates to a system and method for securely accessing a web-based legacy system via a single sign-on infrastructure.

Background Information

In the field of computer-driven systems, legacy systems are generally understood to include old technologies (e.g., old computer hardware, old software-based applications, etc.) that remain in use. Legacy systems can implement a number of critical functions within business enterprise departments such as human resources functions, accounting functions, document retention functions, etc. Often, such legacy systems will have their own user access protocols, which over time have become insecure in the sense that a motivated, adverse party (i.e., hackers) using modern techniques can gain unauthorized use with newer technologies. Nevertheless, in many cases, the cost and effort associated with updating legacy systems (e.g., acquiring up-to-date equipment and software, reliably transferring data, etc.) make the process unduly prohibitive.

Unfortunately, it has become fairly common to hear reports of business enterprises having their systems compromised such that sensitive data (e.g., data for that business enterprise's customers/clients) is stolen or otherwise exposed. Even when a business enterprise takes sufficiently robust steps to guard sensitive data, it is fairly common for enterprises to share sensitive data with other entities that may not have sufficient safeguards in place. This is particularly true for business enterprises that typically handle large quantities of sensitive data, such as law firms, banks, and medical practices, to name a few. When such data-sensitive business enterprises have numerous and/or critical legacy systems, the need for improved security is even more manifest.

SUMMARY

The present disclosure provides systems and methods for securely accessing legacy data without the need to significantly update or alter the legacy system storing such legacy data. A first aspect of the present disclosure is to provide a system for securely accessing legacy data. The system includes an enterprise server including at least a processor and a memory. The enterprise server is configured to communicate with at least (a) a security token service configured to issue a security token, (b) a legacy access provider configured to receive and authenticate the security token, and (c) a legacy system configured to store the legacy data. The processor is configured to execute instructions stored on the memory to cause the enterprise server to: (i) associate a first user account with the security token upon reception of the security token by the enterprise server from the security token service; (ii) communicate the security token from the enterprise server directly to the legacy access provider; (iii) cause the legacy access provider to initiate communication over a network directly with the security token service to request that the security token service authenticate the security token; and (iv) prevent access to the legacy system upon the legacy access provider not verifying authentication of the security token.

In accordance with a second aspect of the present disclosure, which can be combined with the first aspect, steps (i)-(iii) are repeated to access the legacy system upon preventing access to the legacy system.

In accordance with a third aspect of the present disclosure, which can be combined with any one or more of the previous aspects, a second user account is created after the legacy access provider verifies authentication of the security token, and the legacy system is accessed via the first user account and the second user account.

In accordance with a fourth aspect of the present disclosure, which can be combined with any one or more of the previous aspects, at least the second user account is deleted after a single use of the legacy system.

In accordance with a fourth aspect of the present disclosure, which can be combined with any one or more of the previous aspects, the system includes a user interface in operative communication with the enterprise server. The user interface is configured to enable access to enterprise data stored by the enterprise system and to legacy data stored by the legacy system.

In accordance with a sixth aspect of the present disclosure, which can be combined with any one or more of the previous aspects, the enterprise server is configured to cause at least one indicia to be added on the user interface upon reception of the security token. Selection of the at least one indicia causes the communication of the security token to the legacy access provider.

In accordance with a seventh aspect of the present disclosure, which can be combined with any one or more of the previous aspects, the security token service includes a security token service server having a security token service processor and a security token service memory, the security token service being configured to execute instructions stored on the security token service memory to cause the security token service server to issue the security token in response to a request by the enterprise server.

In accordance with an eighth aspect of the present disclosure, which can be combined with any one or more of the previous aspects, the system includes a legacy server having a legacy processor and a legacy memory. The legacy processor is configured to execute instructions stored on the legacy memory to cause the legacy server to create the second user account upon authentication of the security token.

In accordance with a ninth aspect of the present disclosure, which can be combined with any one or more of the previous aspects, the system includes the legacy access provider including an access server having an access processor and an access memory. The access processor is configured to execute instructions stored on the access memory to cause the access server to enable communication between the enterprise server and the legacy server upon authentication of the security token.

A tenth aspect of the present disclosure provides a method for securely accessing a legacy system via an enterprise system. The method includes (i) requesting issuance of a security token by a security token service server of a security token service; (ii) causing, by an enterprise server of an enterprise system, association of a first user account with the security token upon reception of the security token; (iii) communicating the security token from the enterprise server of the enterprise system directly to an access server of a legacy access provider for authentication of the security token; (iv) causing the access server of the legacy access provider to initiate communication over a network directly with the security token service server of the security token service to request that the security token service authenticate the security token; and (v) preventing access to the legacy system upon the legacy access provider not verifying authentication of the security token.

In accordance with an eleventh aspect of the present disclosure, which can be combined with any one or more of the previous aspects, the method includes repeating steps (i)-(iv) upon preventing access to the legacy system.

In accordance with a twelfth aspect of the present disclosure, which can be combined with any one or more of the previous aspects, the method includes enabling creation of a second user account after the legacy access provider verifies authentication of the security token, and accessing the legacy system via the first user account and the second user account.

In accordance with a thirteenth aspect of the present disclosure, which can be combined with any one or more of the previous aspects, the method includes causing at least the second user account to be deleted after a single use of the legacy system.

In accordance with a fourteenth aspect of the present disclosure, which can be combined with any one or more of the previous aspects, the method includes causing at least the second user account to be deleted includes automatically causing the second user account to be deleted upon a user logging out of the first user account.

In accordance with a fifteenth aspect of the present disclosure, which can be combined with any one or more of the previous aspects, the method includes causing at least the second user account to be deleted includes automatically causing the second user account to be deleted upon a user logging out of the second user account.

In accordance with a sixteenth aspect of the present disclosure, which can be combined with any one or more of the previous aspects, the method includes identifying each of the first user account and the second user account by an automatically generated random data string.

A seventeenth aspect of the present disclosure provides a method for securely accessing a legacy system via an enterprise system. The method includes (i) logging into an enterprise server of an enterprise system via a user interface; (ii) causing, via input using the user interface, issuance of a security token by a security token service server of a security token service to the enterprise server of the enterprise system; (iii) selecting, via input using the user interface, an indicia created after issuance of the security token to cause communication of the security token from the enterprise server of the enterprise system directly to an access server of a legacy access provider; (iv) causing the access server of the legacy access provider to initiate communication over a network directly with the security token service server of the security token service to request that the security token service authenticate the security token; and (v) preventing access to the legacy system upon the legacy access provider not verifying authentication of the security token.

In accordance with an eighteenth aspect of the present disclosure, which can be combined with any one or more of the previous aspects, the method includes repeating steps (i)-(iv) upon preventing access to the legacy system.

In accordance with a nineteenth aspect of the present disclosure, which can be combined with any one or more of the previous aspects, the method includes enabling creation of a user account after the legacy access provider verifies authentication of the security token, and accessing, via the user interface, a legacy server of a legacy system via the user account.

In accordance with a twentieth aspect of the present disclosure, which can be combined with any one or more of the previous aspects, the method includes deleting the user account after a single use of the legacy system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
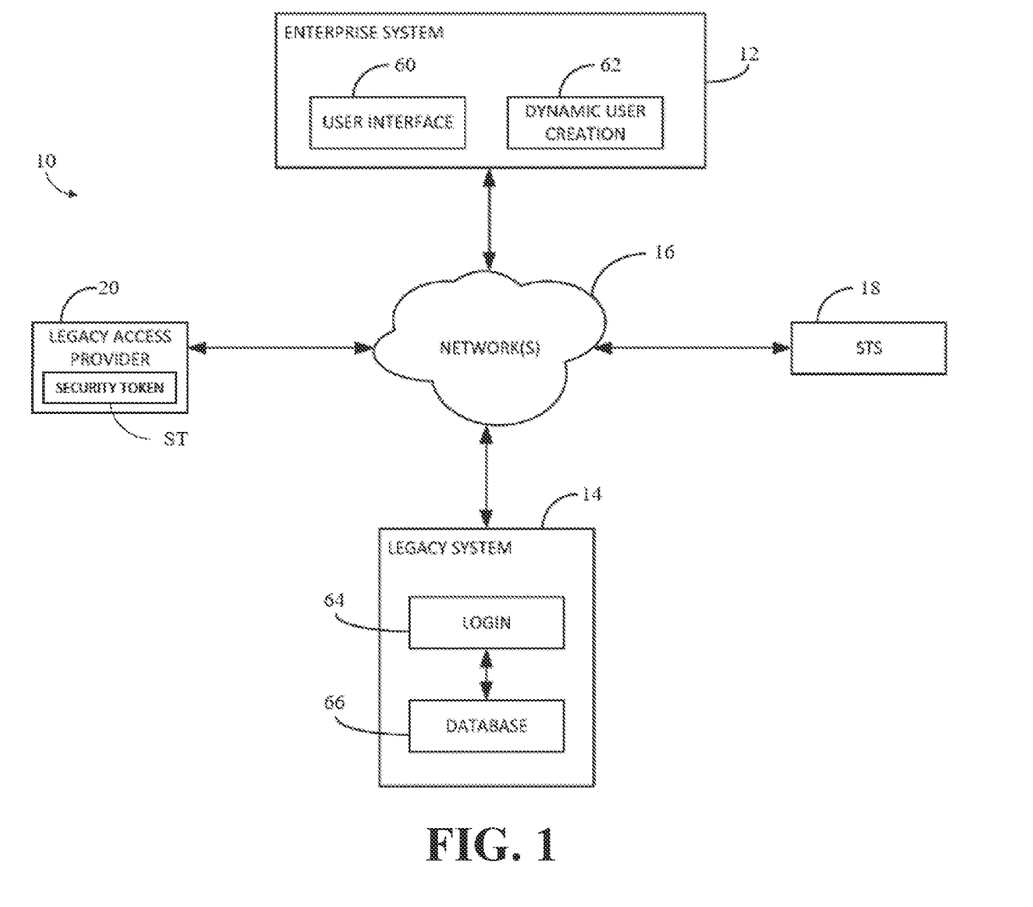
FIG. 1 illustrates an example embodiment of a system for securely accessing legacy data in accordance with the present disclosure.

FIG. 1 illustrates an example embodiment of a system 10 for providing an enterprise system 12 with secure access to a legacy system 14 via one or more intervening network 16. The system 10 can also include a security token service ("STS") 18 and a legacy access provider 20, which likewise communicate with the enterprise system 12 and/or the legacy system 14 via the one or more intervening network 16. In use, the security token service 18 and the legacy access provider 20 enable a federated login infrastructure whereby users of the enterprise system 12 can access the legacy system 14 securely and in a manner that does not risk exposure of any data from the enterprise system 12. More specifically, in an embodiment, the security token service 18 and the legacy access provider 20 enable a federated login infrastructure whereby users of the legacy system 14 within the enterprise system 12 can access the legacy system 14 securely and in a manner that does not risk exposure of any data from the enterprise system 12 to either the legacy system 14 or the legacy access provider 20.

The users of the system 10 can include, for example, employees of a business enterprise utilizing the enterprise system 12 in the regular course of business. The users can also include third parties who are granted access by the business enterprise utilizing the enterprise system 12 in the regular course of business. The enterprise system 12 can include, for example, the business enterprise's current operating hardware and/or software for day-to-day operations.

As explained in more detail below, the security provided by the system 10 described herein enables the business enterprise utilizing the enterprise system 12 to grant third party access to the legacy system 14 without the risk of exposure of sensitive data, even when the legacy system 14 is outdated and thus vulnerable to exposure in normal circumstances without the system 10 in place.

The enterprise system 12, the legacy system 14, the security token service 18, and the legacy access provider 20 can communicate with each other via various communication protocols, for example, via an Internet Protocol Suite or TCP/IP supporting HTTP. The network 16 can comprise a public network (e.g., the Internet, World Wide Web, etc.), a private network (e.g., local area network (LAN), etc.), and/or combinations thereof (e.g., a virtual private network, LAN connected to the Internet, etc.). The network 16 can include a wired network, a wireless network, and/or a combination of the two.

Figure 2:
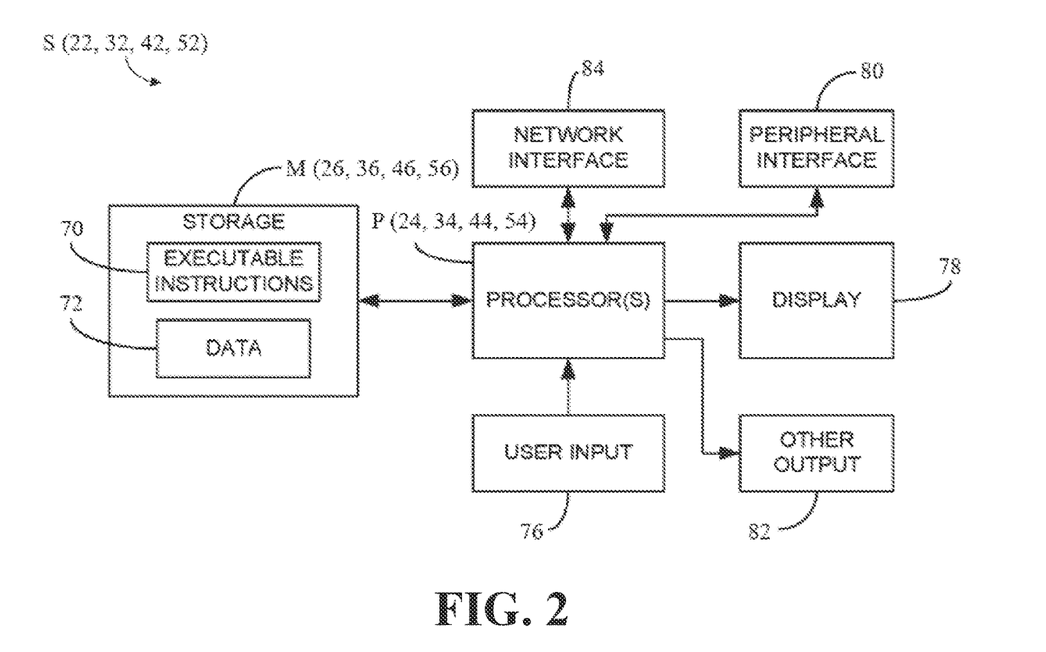
FIG. 2 illustrates a block diagram of an example embodiment of a server which can be used to implement the system of FIG. 1.

Each of the enterprise system 12, the legacy system 14, the security token service 18, and the legacy access provider 20 can include a separate server S having one or more processor and one or more memory. FIG. 2, discussed in more detail below, illustrates an example embodiment of such a server S. The enterprise system 12 can include an enterprise sever 22 having an enterprise processor 24 and an enterprise memory 26, with the enterprise processor 24 configured to execute instructions programmed into and/or stored by the enterprise memory 26. The legacy system 14 can include a legacy server 32 having a legacy processor 34 and a legacy memory 36, with the legacy processor 34 configured to execute instructions programmed into and/or stored by the legacy memory 36. The security token service 18 can include an STS server 42 having an STS processor 44 and an STS memory 46, with the STS processor 44 configured to execute instructions programmed into and/or stored by the STS memory 46. The legacy access provider 20 can include an access server 52 having an access processor 54 and an access memory 56, with the access processor 54 configured to execute instructions programmed into and/or stored by the access memory 56. FIG. 2, discussed in more detail below, illustrates an example embodiment of such a server S. As described in more detail below, the steps of the methods described herein can be stored as instructions on one or more of the memories 22, 32, 42, 52 and executed by one or more of the processors 24, 34, 44, 54.

The enterprise system 12 can include, for example, software or hardware owned or operated by a business enterprise in the regular course of business. For example, the enterprise system 12 can include enterprise software used to satisfy one or more various organizational needs of the business enterprise. The enterprise software can enable, for example, automated billing, payment processing, content management, information technology services, customer relationship management, project management, human resources management, product cataloguing, enterprise resource planning, business intelligence, and various other functions. The data saved in accordance with any of these or other operations can be referred to as "enterprise data" which is stored by the enterprise memory 26. The business enterprise can include, for example, a law firm, an accounting firm, a bank, a medical practice, and/or any other enterprise which stores confidential and/or sensitive information.

In the illustrated embodiment, the enterprise system 12 includes software or hardware configured to provide a user interface 60 for a user of the business enterprise or a third party. The software can be stored using the enterprise memory 26. The hardware can include the enterprise processor 24 configured to execute the software stored by the enterprise memory 26. The user interface 60 can be provided, for example, on a user terminal operated by the user of the business enterprise or third party. In an embodiment, the user interface 60 can include a graphical user interface that provides a unified point of entry for various functions (e.g., software programs, websites, etc.) available to a user within the business enterprise utilizing the system 10. In an embodiment, the user interface 60 can be implemented using an SAP Fiori suite of applications that provides a series of tiles on the user interface 60, with each tile corresponding to a different function that can be selected by a user.

In the illustrated embodiment, the enterprise system 12 further includes dynamic user account software or hardware 62 configured to create one or more user account. The software can be stored using the enterprise memory 26. The hardware can include the enterprise processor 24 configured to execute the software stored using the enterprise memory 26. The dynamic user account software or hardware 62 can enable the creation of user accounts as needed in accordance with the present disclosure. For example, dynamic user account software or hardware 62 can cause the creation of single-use accounts within the enterprise system 12 (e.g., accounts that are valid only as long as they are in use and are thereafter deleted). As described below, the use of such single-use accounts within the enterprise system 12 and/or the legacy system 14 facilitates secure access to the legacy system 14 without the need for sensitive data (e.g., legacy system user credentials) to be shared outside of the enterprise system 12 or its trusted partners. In an embodiment relying on SAP software, the dynamic user account software or hardware 62 can be implemented using the Su01 transaction code. Those skilled in the art will appreciate from this disclosure that other implementations of the dynamic user account software or hardware 62 are also possible.

The legacy system 14 can include, for example, one or more old technology (e.g., old computer systems, old software-based applications, etc.) which differs from a newer technology currently used by the enterprise system 12. That is, the legacy system 14 can be a system running on outdated software or hardware which is different from the software or hardware used to run the enterprise system 12. Thus, the legacy system 14 can include first software and/or first hardware which is an older version than second software and/or second hardware used by the enterprise system 12. The legacy server 32 can also be older and/or outdated in comparison to the enterprise server 22. In an embodiment, the legacy system 14 stores information and/or data created prior to the creation and/or implementation of the software or hardware used to run the enterprise system 12. In an embodiment, the legacy system 14 is a subsystem of the enterprise system 12, wherein the legacy system 14 has been replaced by the enterprise system 12 but still exists within the enterprise system 12.

The legacy system 14 can include, for example, a web-based service that permits user access via the network 16. In an embodiment, the legacy system 14 can include a subscription-based data service provider that delivers web-based access to curated data sets and/or services relevant thereto. As shown, the legacy system 14 can provide a typical login service 64 wherein a user is requested to provide credentials (e.g., a username and password) that are subsequently checked against a suitable database 66 to determine whether the user should be granted access to the legacy system 14. As described in further detail below, the legacy access provider 20 can interact with the login service 64 and database 66 to provide single-use accounts that are valid only as long as they are in use (e.g., upon logout, each single-use account is no longer valid).

The legacy database 66 can be stored using the legacy memory 36. In an embodiment, the legacy database 66 can include a collection of data and/or documents having information of importance to the business enterprise and/or its partners. The data and/or documents can include, for example, legal information, financial information, medical records, business information, and/or any other type of sensitive or confidential information that should be kept out of the public eye. In an embodiment, the data and/or documents can be separated into various categories having differing levels of security, as described in more detail below. The sensitive or confidential data and/or documents stored by the legacy memory 36 can be referred to herein as "legacy data."

The security token service 18 can include, for example, a web-based service capable of issuing, validating, renewing, and/or cancelling security tokens in conjunction with the single sign-on infrastructure disclosed herein. In an embodiment, the single sign-on infrastructure can include a federated service. Federated services typically allow a security token to function as a trusted identifier of the holder of that security token within any services that implement the corresponding security token standard. In an embodiment, the WS-Trust and Security Assertion Markup Language (SAML) can be utilized for this purpose.

In an embodiment, the security token service 18 can provide security tokens ST that serve as the trusted basis for the dynamic user account software or hardware 62 of the enterprise system 12 to create or cause the creation of single-use user accounts. The security token ST can be a digital security token. In providing the security tokens ST, as explained in more detail below, the security token service 18 can implement classes and/or categories of users and establish the entitlements of such user classes and/or categories within a federated infrastructure. For example, two categories within a business enterprise can be "vice presidents" and "assistants," and individuals falling within the category of "vice presidents" within a business enterprise can be permitted to access a wide array of functions within the enterprise system 12 (broad entitlements) as compared to individuals falling within the category of "assistants" within an enterprise who can be permitted to access only a small subset of functions (limited entitlements).

The legacy access provider 20 can include, for example, a web-based service that facilitates interactions between the enterprise system 12 and the legacy system 14. In an embodiment, the legacy access provider 20 validates/authenticates security tokens ST presented by the enterprise system 12 and/or facilitates the creation of single-use accounts within the legacy system 14 when security tokens ST are validated/authenticated.

FIG. 2 illustrates a representative diagram of an example embodiment of a server S which can be used in accordance with the systems and methods described herein. The server S can be an enterprise sever 22, a legacy server 32, an STS server 42, or an access server 52. In an embodiment, the server S can also be a user terminal that can be used to access the user interface 60 of the enterprise system 12. Such a user terminal can include, for example, a cellular phone, a laptop or desktop computer, a tablet, or another electronic device.

As illustrated, a server S can include a processor P (e.g., processor 24, 34, 44 or 54) and a memory M (e.g., memory 26, 36, 46 or 56). The processor P is configured to execute instructions programmed into and/or stored by the memory M. The instructions can be continuously or periodically updated in accordance with the methods discussed below. As described in more detail below, many of the functions described herein can be stored as instructions in the memory M and executed by the processor P.

The term "memory" as used herein can refer to any non-transitory computer useable or computer readable medium or device that can contain, store, communicate, or transport any signal or information that can be used with any processor. For example, a memory can include one or more read only memory (ROM), random access memory (RAM), one or more other memory, and/or combinations thereof.

In an embodiment, the processor P can include one or more processors, such as one or more special purpose processors, one or more digital signal processors, one or more microprocessors, and/or one or more other processors as known in the art. For example, the processor P can include one or more of a microprocessor, a microcontroller, a digital signal processor, a co-processor or the like or combinations thereof capable of executing instructions and operating upon stored data, wherein the instructions and/or data are stored by the memory M. Likewise, the memory M can include one or more non-transitory computer useable or computer readable medium or device that can contain, store, communicate, or transport any signal or information that can be used with any processor P. For example, a memory M can include one or more read only memory (ROM), random access memory (RAM), one or more other memory, and/or combinations thereof. Further still, the memory M can be embodied in a variety of forms, such as a hard drive, optical disc drive, floppy disc drive, etc. In an embodiment, many of the processing techniques described herein are implemented as a combination of executable instructions 70 and data 72 stored within the memory M. The data 72 can be, for example, enterprise data stored by the enterprise memory 26. The data 72 can also be, for example, legacy data stored by the legacy memory 36.

As illustrated, each of the servers S can include one or more of an input device 76, a display 78, a peripheral interface 80, one or more other output device 82, and a network interface 84 in communication with the processor P. FIG. 2 is not intended to be limiting, however, and each server S can include none, one, some, or all of these elements.

The user input device 76 can include any mechanism for providing input to the processor P, for example, a keyboard, a mouse, a touch screen, a microphone and/or suitable voice recognition application, or another input mechanism. The display 78 can include any conventional display mechanism such as a cathode ray tube (CRT), a flat panel display, a touch screen, or another display mechanism. Thus, as can be understood, the user input device 76 and/or the display 78 and/or any other suitable element can be considered a user interface as discussed herein. Further, as can be understood, the display 78 and the user input 76 can be the same device, for example in the case of a touch screen on a smart phone or other device. The peripheral interface 80 can include the hardware, firmware, and/or other software necessary for communication with various peripheral devices, such as media drives (e.g., magnetic disk or optical disk drives), other processing devices, or another input source used as described herein. Likewise, the other output device 82 can optionally include similar media drive mechanisms, other processing devices or other output destinations capable of providing information to a user, such as speakers, LEDs, tactile outputs, etc. The network interface 84 can include hardware, firmware and/or software that allows the processor P to communicate with other devices via wired or wireless networks 16, whether local or wide area, private or public. For example, such networks 16 can include the World Wide Web or Internet, or private enterprise networks, or the like.

Figure 3:
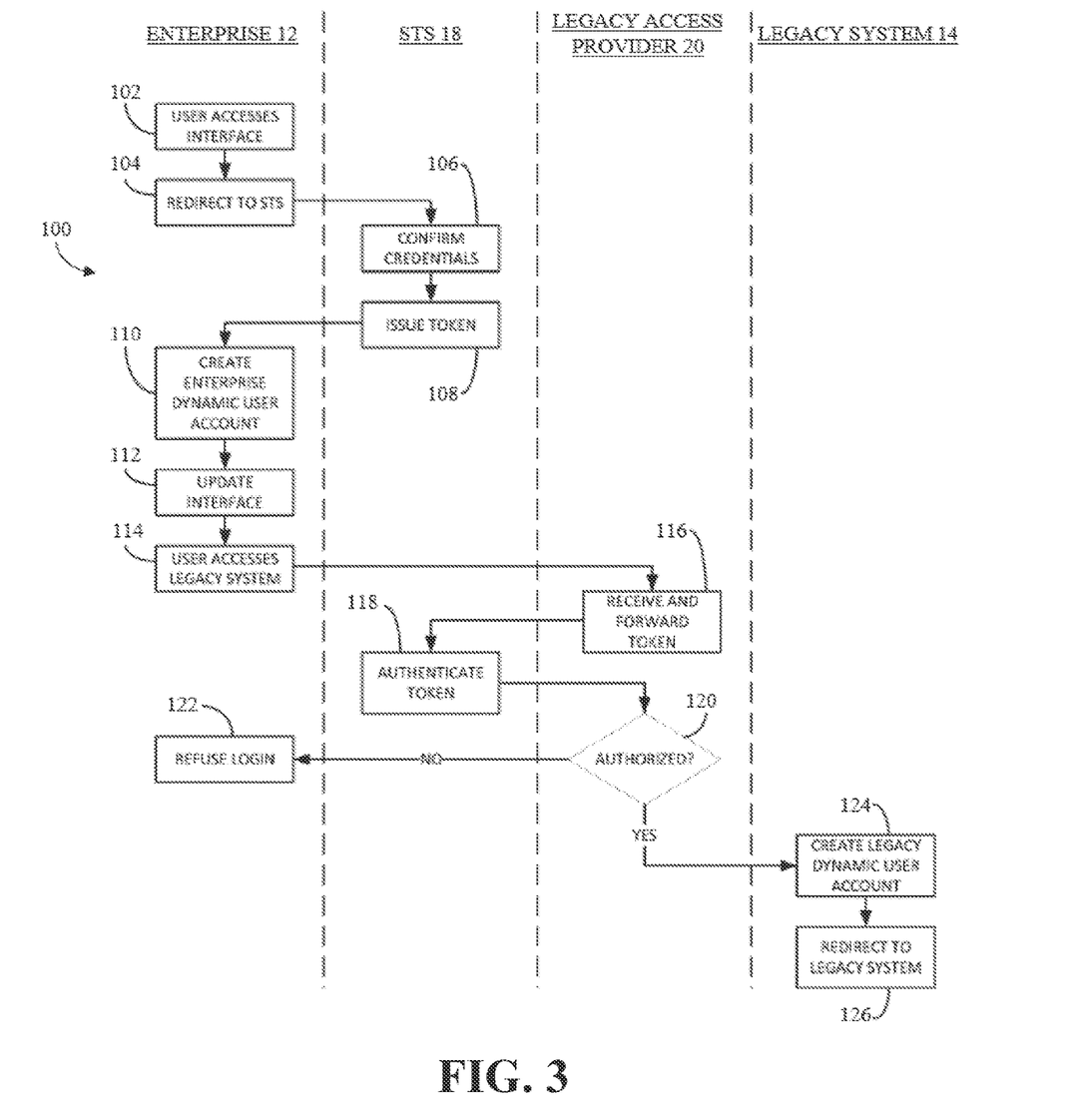
FIG. 3 illustrates a method for securely accessing legacy data in accordance with the present disclosure.

FIG. 3 illustrates an example embodiment of a method 100 for providing an enterprise system 12 with secure access to a legacy system 14 in accordance with the present disclosure. Some or all of the steps of method 100 can be stored as instructions on one or more of the memories 26, 36, 46, 56 discussed herein and can be executed by one or more of the processors 24, 34, 44, 54 in accordance with the respective instructions stored on one or more of the memories 26, 36, 46, 56. It should be understood that some of the steps described herein can be reordered or omitted without departing from the spirit or scope of method 100.

At step 102, a user can access the enterprise server 22 of the enterprise system 12, for example, by accessing the user interface 60 of the enterprise system 12. The user interface can be accessed, for example, via a personal electronic device such as a cellular phone, a laptop or desktop computer, a tablet, or another electronic device. In an embodiment, the user can access the user interface 60 by accessing a uniform resource locator (URL) specifically designated for this purpose. The user can be an employee of the business enterprise running the enterprise system 12, or can be a third party operating in conjunction with the business enterprise running the enterprise system 12.

At step 104, rather than attempting to directly authenticate the user using an internal database (e.g., an Active Directory service), the enterprise server 22 of the enterprise system 12 can redirect the user to the STS server 42 of the security token service 18 via the user interface 60. The user can be redirected, for example, in accordance with the WS-Trust standard. In an embodiment, the STS server 42 can gain control of the user interface 60 at this stage. In another embodiment, the enterprise server 22 can maintain control of the user interface 60 as the STS server 42 operates in the background without the user's knowledge.

At step 106, the user's credentials are processed by the STS server 42 of the security token service 18. Here, the user can enter his or her credentials using the user interface 60 of enterprise system 12. In another embodiment, the user can enter his or her credentials using a biometric identification method. For example, the biometric identification method can include one or more of a fingerprint scan, a palm scan, a facial scan, an eye scan (e.g., iris or retina recognition), and/or a voice scan. When using a biometric identification method, the enterprise system can include a camera and/or a microphone to perform the scan.

The user can enter his or her credentials during step 102 and have the credentials transmitted from the enterprise server 22 of the enterprise system 12 to the STS server 42 of the security token service 18 without the user's knowledge at step 106, or the user can enter his or her credentials after being redirected to the security token service 18 via the user interface 22. The user's credentials are then used to permit validation by the STS server 42 of the security token service 18. The user's credentials can include, for example, a username, a password, and/or any other identifying information used to confirm the user's identity.

At step 108, after verifying the user's credentials, the STS server 42 of the security token service 18 can generate a security token ST that is specific for that user. The security token ST can include an indication of the categories and entitlements applicable to the now-verified user. The security token ST does not include any information about the user's authentication credentials or any other data that might be used to facilitate identification of the user. The security token service 18 can then redirect the user back to the enterprise server 22 of the enterprise system 12.

At step 110, the security token ST can be used by the enterprise server 22 of the enterprise system 12 to cause the creation of a first user account and/or associate the security token ST therewith. The first user account can also be referred to as an enterprise dynamic user account. The first user account can be a single-use account. The enterprise server 22 of the enterprise system 12 can also associate the security token ST with a previously-created first user account. In an embodiment, no personally-identifiable information about the user is included in the first user account. That is, the first user account is identifiable only by an automatically generated random data string, which is generated at the time of creation of the first user account (e.g., at step 110).

At step 112, the user has been fully authenticated within the federated infrastructure. The enterprise server 22 of the enterprise system 12 accordingly updates the user interface 60 to include indicia of all available functions including access to the legacy system 14. In an embodiment, the enterprise server 22 of the enterprise system 12 adds one or more indicia that were not previously presented on the user interface 60, which informs the user that the first account has been created and/or that the user has been authenticated by the STS server 42 of the security token service 18. In an embodiment, the enterprise server 22 of the enterprise system 12 adds one or more indicia by altering the user interface 60 so that one or more previously inaccessible indicia is able to be selected by the user. In another embodiment, the enterprise server 22 of the enterprise system 12 adds a different number of indicia depending on the categories and entitlements determined by the STS server 42 of the of the security token service 18 at 108. For example, a user with broad entitlements can receive a user interface 60 with more indicia than a user with lesser entitlements.

At step 114, the enterprise server 22 of the enterprise system 12 can redirect the user to the access server 52 of the legacy access provider 20 upon selection of a corresponding indicia presented by the user interface 60. This causes the security token ST associated with the user's enterprise dynamic user account to be forwarded to the access server 52 of the legacy access provider 20. In an embodiment, the indicia presented by the user interface 60 and selected by the user can be a single indicia corresponding to all access available to the user, and selection of the indicia can cause the enterprise server 22 to redirect the user to the access server 52 for permission to review any and all data to which the user is entitled. In another embodiment, the indicia presented by the user interface 60 and selected by the user can be one of a plurality of indicia corresponding to various access levels available to the user, and selection of the indicia can cause the enterprise server 22 to redirect the user to the access server 52 for permission to review data related to that access level.

At step 116, the access server 52 of the legacy access provider 20 receives the security token ST from the enterprise server 22 of the enterprise system 12. By receiving the security token ST from the enterprise server 22 instead of the STS server 42, the access server 52 can ensure that the security token is associated with the first user account created by the enterprise server 22 at step 110. The access server 52 of the legacy access provider 20 then initiates communication with the STS server 42 of the security token service 18 and requests that the STS server 42 of the security token service 18 authenticate the security token ST now associated with the first user account.

At step 118, the STS server 42 of the security token service 18 attempts to authenticate the security token ST. Step 118 can be performed, for example, in accordance with relevant WS-Trust and SAML protocols. The STS server 42 of the security token service 18 then communicates the results of the authentication process back to the access server 52 of the legacy access provider 20, for example, regardless of whether the security token ST is or is not authenticated. In an embodiment, the STS server 42 of the security token service 18 can also communicate the results to the enterprise server 22 of the enterprise system 12.

At step 120, based on the authentication performed by the STS server 44 of the security token service 18 at step 118, the access server 52 of the legacy access provider 20 communicates with either the enterprise server 22 of the enterprise system 12 and/or the legacy server 32 of the legacy system 14. In an embodiment, if the security token ST has not been authenticated at step 118, then the access server 52 of the legacy access provider 20 only communicates with the enterprise server 22 of the enterprise system 12. If the security token ST has been authenticated at step 118, then the access server 52 of the legacy access provider 20 enables communication between the enterprise server 22 of the enterprise system 12 and legacy server 32 of the legacy system 14.

At step 122, if the security token ST was not authenticated by the STS server of the security token service 18 at step 118, the enterprise server 22 of the enterprise system 12 causes an authentication failure message to be provided to the user via the user interface 60. The user is thereafter prevented from entering the legacy system 14. The user can thereafter attempt another login by returning to step 102. Only by beginning another login attempt at step 102 and fully completing method 100 can the user then gain access to the legacy system 14.

At step 124, if the security token ST was authenticated by the STS server of the security token service 18 at step 118, the access server 52 of the legacy access provider 20 creates a second user account. The second user account can also be referred to as a legacy dynamic user account on behalf of the user within the legacy server 32 of the legacy system 14. The second user account can be a single-use account. Once again, second user account does not include any personally-identifying information about the user. That is, the second user account is identifiable only by an automatically generated random data string which is generated at the time of creation of the second user account (e.g., at step 124). Thus, although creation of the second user account occurs at the legacy server 34 of the legacy system 14, the creation of the second user account is caused by the enterprise server 22 of the enterprise system 12 transmitting a valid security token ST to the access server 54 of the legacy access provider 20 at step 116.

At step 126, which can occur in parallel with step 124, the access server 52 of the legacy access provider 20 redirects the user to the legacy server 32 of the legacy system 14 where, using the second user account created at step 124, the user is able to access and utilize the legacy server 32 of the legacy system 14. Here, the user is able to access and utilize the legacy server 32 of the legacy system 14 via the user interface 60. The user can access and utilize the legacy server 32, for example, by viewing documents and/or data stored by the legacy memory 36.

When the user is done accessing the legacy server 32 of the legacy system 14 (e.g., when the user logs out of or is logged out of the legacy system 14 after a period of nonuse), the enterprise server 22 of the enterprise system 12 detects this event and informs the STS server 42 of the security token service 18 that the security token ST corresponding to the user should be invalidated. Consequently, any further user of that security token ST will not be validated by the STS server 42 of the security token service 18. Upon detection of the log out event, the legacy server 32 of the legacy system 14 will cause the second user account to be deleted. Additionally, upon detection of the log out event, the enterprise server 22 can cause the first user account to be deleted. Further still, upon detection of the log out event, the enterprise server 22 of the enterprise system 12 can cause the access server 52 of the legacy access provider 20 to delete any records pertaining to the now-invalidated token, and the access server 52 of the legacy access provider 20 deletes those records. Because the second user account and corresponding records are deleted upon log out, any compromise of such account will reveal no lasting information that could be of use to an adverse party later on.

Thus, through the use of the security token ST to initiate the creation of the second user account in the legacy system 14 overall security through use of the legacy system 14 is improved such that any compromise of the legacy system 14 or the legacy service provider 20 will not reveal any sensitive information about the user. A particularly powerful result of the method 100 is that the system 10 can be employed to improve the security of any web-based legacy system to the extent that the legacy access provider 20 can cause the generation of single-use accounts within that legacy system 14.

In an embodiment, upon a user logging out of the first user account, the enterprise server 22 will instruct the legacy server 32 to automatically delete the second user account. In an embodiment, the enterprise server 32 can also automatically delete the first user account at this time. The user can log out of the first user account by selecting a "log out" option using the user interface 60, or by a period of inaction using the user interface 60. Likewise, upon a user logging out of the second user account, the legacy server 32 will automatically delete the second user account. In an embodiment, the enterprise server 22 can also automatically delete the first user account at this time. Again, the user can log out of the second user account by selecting a "log out" option using the user interface 60, or by a period of inaction using the user interface 60. In either case, the enterprise server 22 can communicate with the legacy server 32 to cause at least the second user account to be automatically deleted when the user completed method 100.

The embodiments described herein provide improved systems and methods for securely accessing legacy data from a separate server. By using a separate server to create a single-use user account as discussed herein, security can be improved, processing speeds can be increased, and memory space can be conserved in comparison to other systems. Particularly for enterprises managing large amounts of legacy data, the systems and methods enable the data to be secured without the time, expense and effort of constantly updating the legacy system with the newest equipment and software. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A system for securely accessing legacy data, the system comprising:
   an enterprise server including at least a processor and a memory, the enterprise server configured to communicate with at least (a) a security token service configured to issue a security token, (b) a legacy access provider configured to receive and authenticate the security token, and (c) a legacy system configured to store the legacy data;
   the processor being configured to execute instructions stored on the memory to cause the enterprise server to:
   (i) associate a first user account with the security token upon reception of the security token by the enterprise server from the security token service;
   (ii) communicate the security token from the enterprise server directly to the legacy access provider,
   (iii) cause the legacy access provider to initiate communication over a network directly with the security token service to request that the security token service authenticate the security token; and
   (iv) prevent access to the legacy system upon the legacy access provider not verifying authentication of the security token.

2. The system according to claim 1, wherein
   upon preventing access to the legacy system, repeating steps (i)-(iii) to access the legacy system.

3. The system according to claim 2, wherein
   a second user account is created after the legacy access provider verifies authentication of the security token, and the legacy system is accessed via the first user account and the second user account.

4. The system according to claim 3, wherein
   at least the second user account is deleted after a single use of the legacy system.

5. The system according to claim 1, wherein
   a user interface is in operative communication with the enterprise server, the user interface being configured to enable access to enterprise data stored by the enterprise system and to legacy data stored by the legacy system.

6. The system according to claim 5, wherein
   the enterprise server is configured to cause at least one indicia to be added on the user interface upon reception of the security token, and
   selection of the at least one indicia causes the communication of the security token to the legacy access provider.

7. The system according to claim 1, wherein
   the security token service includes a security token service server having a security token service processor and a security token service memory, the security token service being configured to execute instructions stored on the security token service memory to cause the security token service server to issue the security token in response to a request by the enterprise server.

8. The system according to claim 3, wherein
   the legacy system includes a legacy server having a legacy processor and a legacy memory, the legacy processor being configured to execute instructions stored on the legacy memory to cause the legacy server to create the second user account upon authentication of the security token.

9. The system according to claim 8, wherein
   the legacy access provider includes an access server having an access processor and an access memory, the access processor being configured to execute instructions stored on the access memory to cause the access server to enable communication between the enterprise server and the legacy server upon authentication of the security token.

10. A method for securely accessing a legacy system via an enterprise system, the method comprising:
    (i) requesting issuance of a security token by a security token service server of a security token service;
    (ii) causing, by an enterprise server of an enterprise system, association of a first user account with the security token upon reception of the security token;
    (iii) communicating the security token from the enterprise server of the enterprise system directly to an access server of a legacy access provider for authentication of the security token;
    (iv) causing the access server of the legacy access provider to initiate communication over a network directly with the security token service server of the security token service to request that the security token service authenticate the security token; and
    (v) preventing access to the legacy system upon the legacy access provider not verifying authentication of the security token.

11. The method according to claim 10, further comprising repeating steps (i)-(iv) upon preventing access to the legacy system.

12. The method according to claim 11, further comprising enabling creation of a second user account after the legacy access provider verifies authentication of the security token, and accessing the legacy system via the first user account and the second user account.

13. The method according to claim 12, further comprising causing at least the second user account to be deleted after a single use of the legacy system.

14. The method according to claim 13, wherein
causing at least the second user account to be deleted includes automatically causing the second user account to be deleted upon a user logging out of the first user account.

15. The method according to claim 13, wherein
causing at least the second user account to be deleted includes automatically causing the second user account to be deleted upon a user logging out of the second user account.

16. The method according to claim 12, further comprising identifying each of the first user account and the second user account by an automatically generated random data string.

17. A method for securely accessing a legacy system via an enterprise system, the method comprising:
   (i) logging into an enterprise server of an enterprise system via a user interface;
   (ii) causing, via input using the user interface, issuance of a security token by a security token service server of a security token service to the enterprise server of the enterprise system;
   (iii) selecting, via input using the user interface, an indicia created after issuance of the security token to cause communication of the security token from the enterprise server of the enterprise system directly to an access server of a legacy access provider;
   (iv) causing the access server of the legacy access provider to initiate communication over a network directly with the security token service server of the security token service to request that the security token service authenticate the security token; and
   (v) preventing access to the legacy system upon the legacy access provider not verifying authentication of the security token.

18. The method according to claim 17, further comprising repeating steps (i)-(iv) upon preventing access to the legacy system.

19. The method according to claim 17, further comprising enabling creation of a user account after the legacy access provider verifies authentication of the security token, and
accessing, via the user interface, a legacy server of the legacy system via the user account.

20. The method according to claim 18, further comprising deleting the user account after a single use of the legacy system.

* * * * *